J. R. PADDACK.
WATER METERS.

No. 182,697.  
Patented Sept. 26, 1876.

4 Sheets—Sheet 1.

Witnesses:  
W. G. Leopold  
J. B. Hammond

Inventor:  
Jas. R. Paddack

J. R. PADDACK.
WATER METERS.

No. 182,697.  Patented Sept. 26, 1876.

Witnesses:
Harry Leopold.
J. B. Hammond

Inventor:
Jas. R. Paddack.

J. R. PADDACK.
WATER METERS.

No. 182,697. Patented Sept. 26, 1876.

Witnesses:
H. G. Leopold
J. B. Hammons

Inventor:
Jas. R. Paddack.

J. R. PADDACK.
WATER METERS.

No. 182,697. Patented Sept. 26, 1876.

Witnesses;
H. G. Leopold.
J. B. Hammond

Inventor;
Jas. R. Paddack.

UNITED STATES PATENT OFFICE.

JAMES R. PADDACK, OF CHICAGO, ILLINOIS.

IMPROVEMENT IN WATER-METERS.

Specification forming part of Letters Patent No. 182,697, dated September 26, 1876; application filed October 23, 1875.

*To all whom it may concern:*

Be it known that I, JAMES R. PADDACK, of Chicago, in the county of Cook and the State of Illinois, have invented a new and useful Improvement in Water-Meters, of which the following is a specification:

The invention relates to that class of meters in which two cylinders, provided with plungers, are used; and consists in a simple method of employing the plunger of each cylinder so that it shall serve as a valve to control the admission of water to, and its discharge from, the opposite cylinder, dispensing entirely with separate valves, and appliances for actuating them, and performing their duty in a more simple, direct, and reliable manner.

Figure 2:
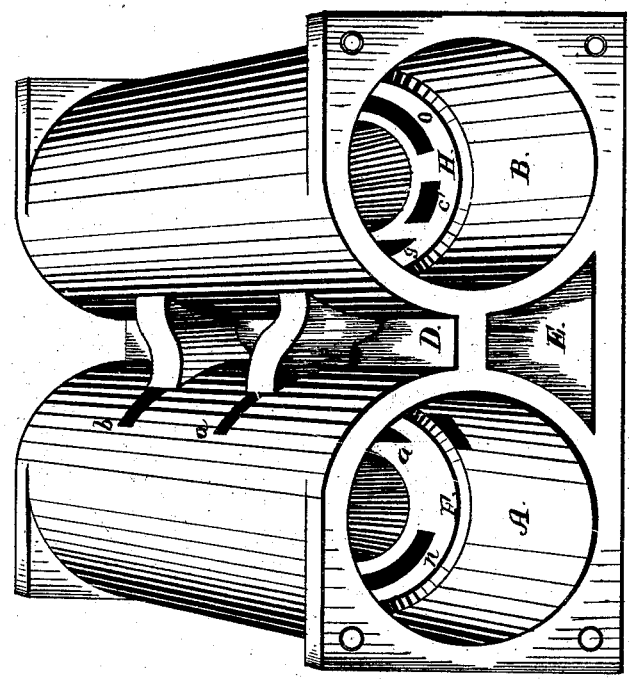
Figure 1:
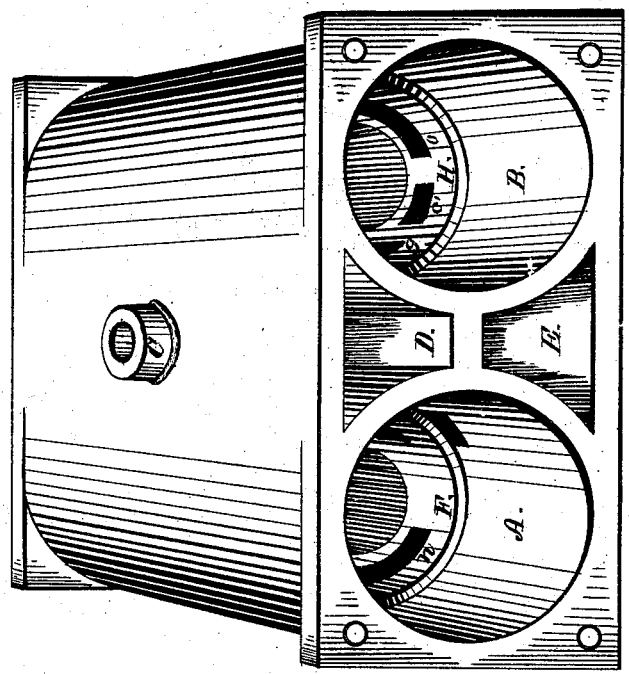
Figure 3:
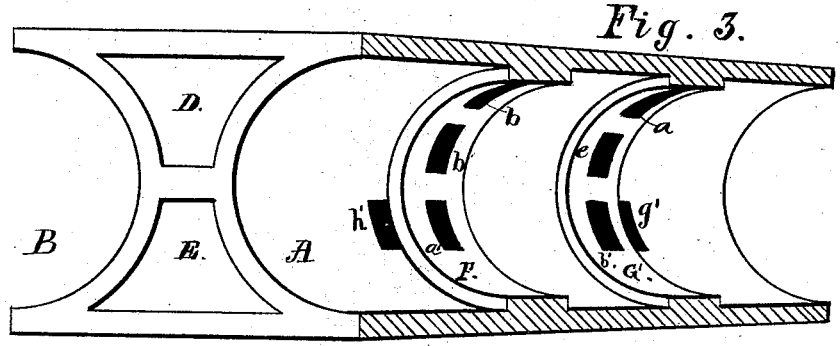
Figure 4:
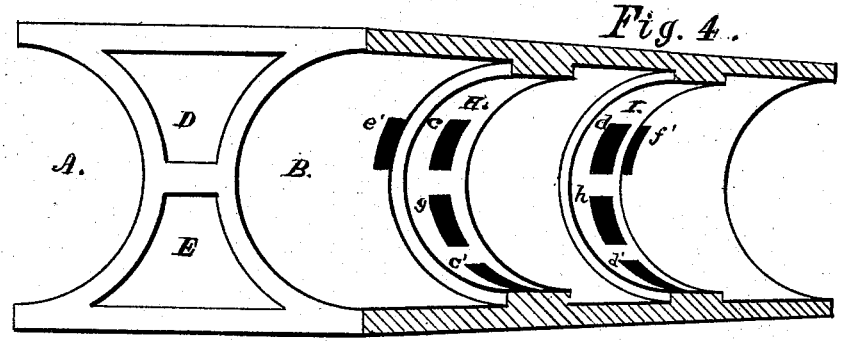
Figure 5:
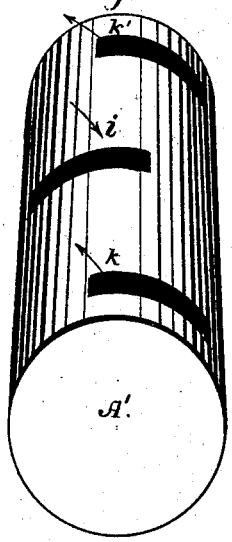
Figure 6:
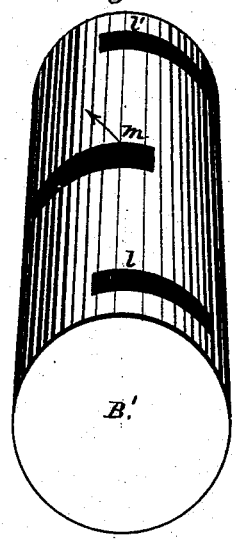
Figure 7:
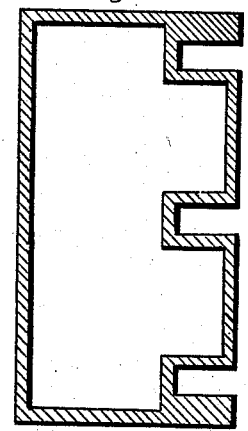
Figure 9:
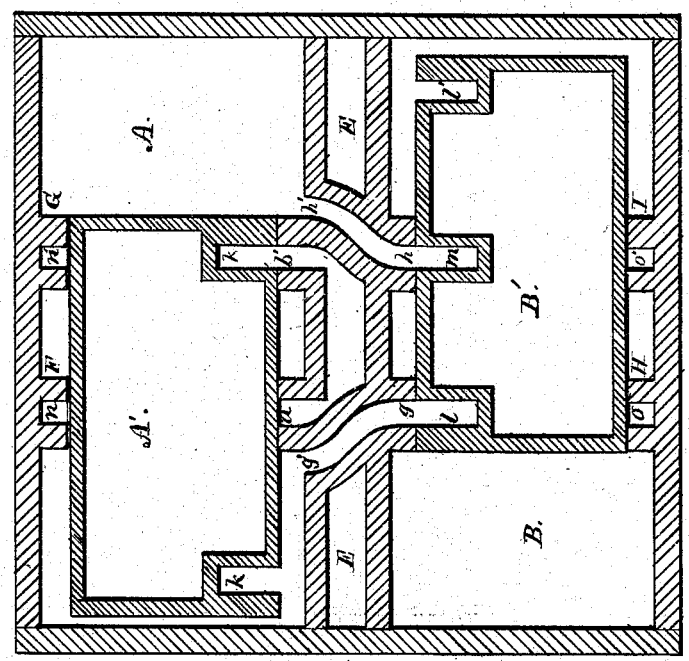
Figure 8:
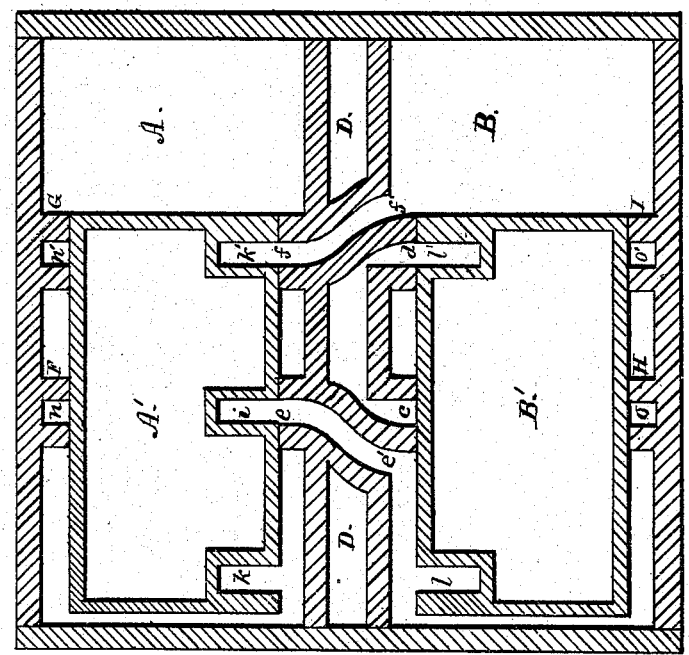
Figure 10:
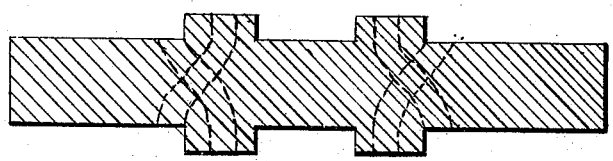
Figure 11:
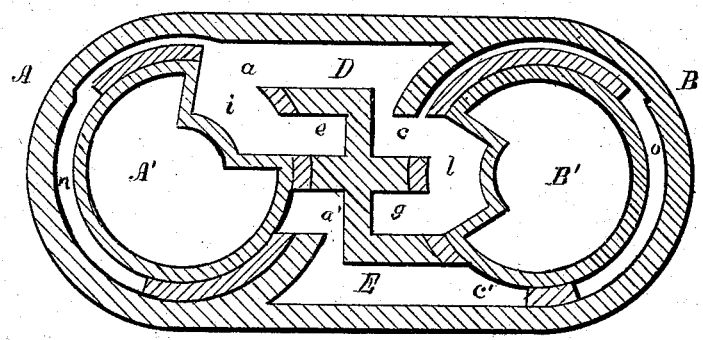
Figure 12:
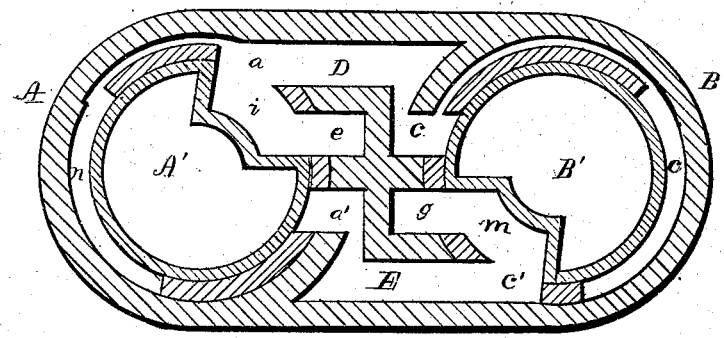

Figure 1 is a perspective view of the meter with the cap off of one end, showing the relative position of the cylinders and their connections. Fig. 2 is a perspective view, with the shell of the receiving-chamber cut away, showing two bridges extending between the cylinders, through which channels run, connecting the upper portion of the cylinders. Bridges extend in a similar manner across the lower or discharge chamber, affording communication between the lower portions of the cylinders. Figs. 3 and 4 are perspective longitudinal sections through the cylinders, showing the halves which adjoin and contain all the ports. Figs. 5 and 6 are perspective views of the plungers, and Fig. 7 is a horizontal section of them. Figs. 8 and 9 are horizontal sections, 8 being taken just above the partition which separates the receiving and discharge chambers, and 9 being taken just below it. Fig. 10 is a horizontal section through the middle of the partition only. Figs. 11 and 12 are vertical transverse sections through the packing-rings and plungers.

A and B represent the cylinders; D, the receiving-chamber; E, the discharge-chamber; F, G, H, and I the packing-rings; C, receiving-inlet. The discharge-outlet leads from the bottom of the discharge-chamber. $a$ and $b$ are the receiving-ports of cylinder A, opening from the top of the receiving-chamber through the packing-rings into the cylinder. $c$ and $d$ are the receiving-ports of cylinder B corresponding with those of A. $a'$ and $b'$ are the discharge-ports of cylinder A, opening from the cylinder through the packing-rings into the discharge-chamber. $c'$ and $d'$ are the discharge-ports of cylinder B corresponding with those of A. $e$ and $f$ are the connecting-ports of upper portion of cylinder A. $e'$ and $f'$ are the connecting-ports of the upper portion of cylinder B. These ports are connected, $e$ in cylinder A with $e'$ in cylinder B, and $f$ in cylinder A with $f'$ in cylinder B, by channels running through the upper bridges, as shown in Figs. 8. $g$ and $h$ are the connecting-ports of the lower portion of cylinder B. $g'$ and $h'$ are the connecting-ports of the lower portion of cylinder A, the corresponding ports being connected in a similar manner to the upper ones, by channels running through the lower bridges, as shown in Fig. 9. $i$ is the receiving-cavity, $k$ and $k'$ the discharge-cavities, of plunger A'. $l$ and $l'$ are the receiving-cavities, and $m$ the discharge-cavity, of plunger B'.

The plungers A' and B' are guided to prevent rotary motion by lugs or guide-posts extending up on one end, and moving in grooves on the inside of the cylinders. $n$, $n'$, $o$, and $o'$ are counter-pressure channels, leading, as shown in Figs. 11 and 12, back of the packing-rings, until they come opposite the ports, then opening through the rings, giving the same area for water-pressure against the side of the plunger as is given by all the ports on the opposite side, thus balancing the pressure on the plunger through the ports, and supporting the weight of the plunger.

The operation is as follows: As seen in Fig. 8, the plungers are at the same end of their respective cylinders, the receiving-cavity of plunger A' covering receiving-port $a$, and connecting-port $e$, as shown in Fig. 11, opening communication direct between the receiving-chamber and the left end of cylinder B; at the same time the discharge-cavity of plunger A' covers connecting-port $f$ and discharge-port $b'$ of cylinder A, opening communication direct between the right end of cylinder B and the discharge-chamber. Now, when water is drawn from the discharge-pipe, relieving the pressure in the discharge-chamber, and in the right end of cylinder B, which is connected with it, the pressure transmitted from the receiving-chamber through to the left end of plunger B' forces it from left to right, forcing the water in the right end of cylinder B into the discharge chamber and pipe. When plunger B' reaches the end of its travel to the right, its receiving-cavity $l$ covers receiving-port $c$ and connecting-port $g$, opening communication between the receiving-chamber and the left end of cylinder A; and its discharge-cavity $m$ covers connecting-port $h$ and discharge-port $d'$, opening communication between the right end of cylinder A and the discharge-chamber, pressure being thus opened to the left end of plunger A', and discharge from its right end. It follows plunger B' from left to right, forcing water in the right end of cylinder A into the discharge, and on reaching the end of its travel its cavities open the proper ports for cylinder B, causing the return travel of its plunger from right to left, forcing the water in the left end of cylinder B into the discharge, and opening the proper ports for the return travel of plunger A', and so on continuously, B' moving first, and A' following.

The co-operation of the plungers is such that each cuts off the pressure, and arrests the travel of its fellow at the proper time.

The receiving and discharge chambers may be reversed by reversing the connections, water passing through and operating the machine the same in either direction.

It also may be operated in either vertical or horizontal position, at pleasure.

It may be used as a water-motor or direct-acting water-engine, by connecting-rods, to one end of each plunger, extending them through the head in a stuffing-box, and making external connections for the work to be performed.

The water is measured by the displacement of the plungers, the strokes of which are recorded by a register. No register is shown here, as it has no connection with the invention, and any register desired may be used. The guide-posts on the end of the plungers serve to actuate the register in the usual manner.

What I claim as new, and desire to secure by Letters Patent, is—

1. The combination, with cylinders A and B, receiving-chamber D, discharge-chamber E, and plungers A' and B', of a series of receiving-ports, $a$, $b$, $c$, and $d$, a series of connecting channels or ports, $e\ e'$, $f\ f'$, $g\ g'$, and $h\ h'$, and a series of discharge-ports, $a'$, $b'$, $c'$, and $d'$, arranged substantially as described.

2. The plunger A', having three D-cavities, arranged as described, and operating both as plunger and valve, and capable of being used in either cylinder by reversing its position, and when used in one cylinder its end cavities forming receiving and connecting ports, and its middle cavity forming connecting and discharge ports; and when used in the other cylinder its center cavity forming receiving and connecting ports, and its end cavities forming connecting and discharge ports.

3. The combination, with plungers A' and B', of the channels $n$, $n'$, $o$, and $o'$, arranged as described.

JAMES R. PADDACK.

Witnesses:
H. G. LEOPOLD,
JOHN WHITEHEAD.